United States Patent
Holmes et al.

(10) Patent No.: US 8,997,370 B2
(45) Date of Patent: Apr. 7, 2015

(54) CENTRIFUGAL DRYER WITH REPLACEABLE BLADES AND SELF-CLEANING ROTOR SEAL AND CENTRIFUGAL DEWATERING TOWER

(76) Inventors: George A. Holmes, West Chicago, IL (US); Tadeuz Rybka, Streamwood, IL (US)

(*) Notice: Subject to any disclaimer, the term of this patent is extended or adjusted under 35 U.S.C. 154(b) by 819 days.

(21) Appl. No.: 13/148,969

(22) PCT Filed: Feb. 11, 2010

(86) PCT No.: PCT/US2010/023930
§ 371 (c)(1),
(2), (4) Date: Aug. 11, 2011

(87) PCT Pub. No.: WO2010/093813
PCT Pub. Date: Aug. 19, 2010

(65) Prior Publication Data
US 2011/0308100 A1    Dec. 22, 2011

Related U.S. Application Data

(60) Provisional application No. 61/151,730, filed on Feb. 11, 2009.

(51) Int. Cl.
| F26B 17/34 | (2006.01) |
| F26B 17/24 | (2006.01) |
| F16J 15/16 | (2006.01) |
| F26B 5/08 | (2006.01) |
| B29B 9/16 | (2006.01) |
| B29B 9/06 | (2006.01) |

(52) U.S. Cl.
CPC .............. *F26B 17/24* (2013.01); *F16J 15/164* (2013.01); *F26B 5/08* (2013.01); *B29B 9/16* (2013.01); *B29B 9/065* (2013.01)

(58) Field of Classification Search
CPC ............ F26B 17/30; F26B 17/34; F26B 5/08; F16J 15/164; B29B 9/16; B29B 9/065
USPC .................................. 34/58, 59, 168, 174, 181
See application file for complete search history.

(56) References Cited

U.S. PATENT DOCUMENTS 4,049,240 A * 9/1977 Walters, Jr. ................. 366/155.1
4,896,435 A    1/1990 Spangler, Jr.
(Continued)

FOREIGN PATENT DOCUMENTS

| DE | 19608154 A1 * | 9/1997 |
| EP | 1902 825 A1 | 8/2011 |
| GB | 481705 A * | 3/1938 |

OTHER PUBLICATIONS

International Search Report Aug. 2010.
(Continued)

*Primary Examiner* — Jiping Lu
(74) *Attorney, Agent, or Firm* — Clifford Kraft

(57) ABSTRACT

A centrifugal pellet dryer with a self-cleaning rotor seal, replaceable wear plates, and a fluid powered dewatering tower is presented. The self-cleaning rotor seal includes a plurality of grooves that are structured to eject pellet debris that migrates into between the seal and the housing for the rotor. The replaceable wear plates are secured to the rotor at locations such that they contact pellets that are entering the rotor housing. The dewatering tower includes a helical augur that dewaters a pellet slurry and delivers partially dried pellets to the rotor housing.

12 Claims, 4 Drawing Sheets

(56) References Cited

U.S. PATENT DOCUMENTS 5,187,880 A * 2/1993 Rudolph .................. 34/313
2008/0072447 A1 3/2008 Hehenberger et al.

OTHER PUBLICATIONS

International Search Report and Written Opinion Feb. 8, 2011.

* cited by examiner

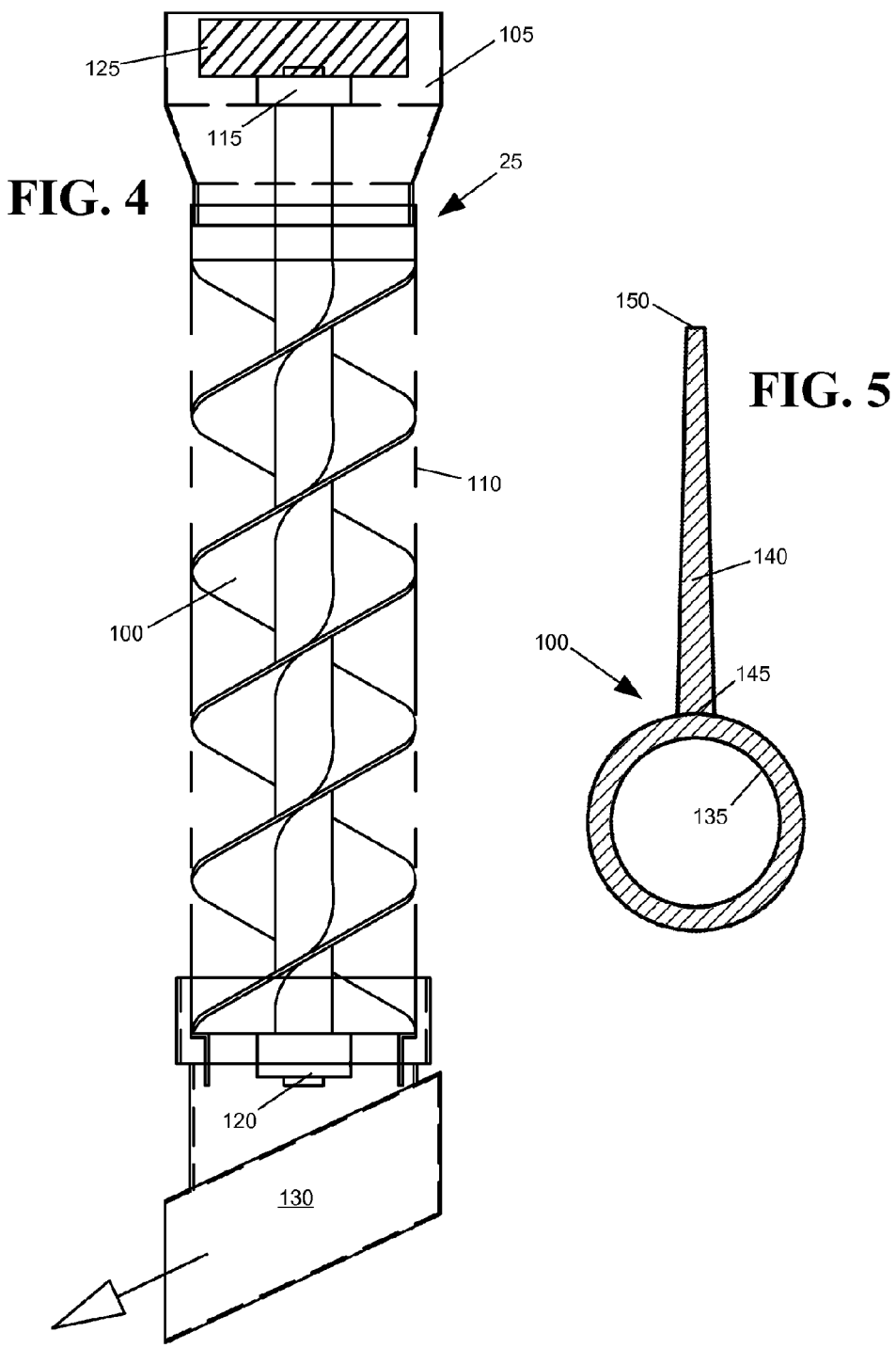

CENTRIFUGAL DRYER WITH REPLACEABLE BLADES AND SELF-CLEANING ROTOR SEAL AND CENTRIFUGAL DEWATERING TOWER

FIELD OF THE INVENTION

This invention pertains to the field of pellet dryers that are used to dry plastic pellets after the pellets have been extruded through a pelletizer. More specifically, the invention pertains to equipment for separating plastic pellets from a fluid stream and drying them.

BACKGROUND OF THE INVENTION

Extruders and processes for extruding plastic material and forming pellets there from have been known and used for some time. Once plastic pellets have been extruded, they are commonly placed into a fluid stream, such as water. The fluid stream serves to cool the plastic pellets and allow them to form, while also carrying the plastic pellets to subsequent steps in the process. Such an extruder or pelletizer may be referred to as an underwater pelletizer, water ring pelletizer or other form.

U.S. Pat. No. 4,529,370 illustrates one example of a conventional underwater pelletizer. Another example of a conventional underwater pelletizer is shown in U.S. Pat. No. 5,059,103.

One subsequent step in the pelletizing process is drying the plastic pellets. However, in order to dry the pellets, the pellets must be separated from the fluid stream. Conventional centrifugal pellet dryers can be seen in U.S. Pat. Nos. 4,565,015, 5,611,150, and 5,987,769, as well as International patent application publication WO2002/031420. Conventional centrifugal pellet dryers operate to separate the pellets from a slurry of pellets and water, but often cause deformation of the pellets or produce plastic remnants that may become imbedded in the parts of the pellet dryer machinery and often must be thoroughly cleaned out to avoid contaminating subsequent batches of pellets.

BRIEF SUMMARY OF THE INVENTION

In one exemplary embodiment of the present invention, a centrifugal dryer assembly is shown having a rotor with replaceable blades adjacent to a pellet intake port, where the rotor includes a self-cleaning rotor seal that prevents pellets from becoming lodged in the dryer housing or bearing area.

In an exemplary embodiment of another aspect of the present invention, a dewatering tower is shown having a helical auger rotationally mounted with a perforated sleeve. A drive mechanism, such as a water turbine, is configured to drive the helical auger to rotate such that the rotational motion separates liquid from the pellet slurry from pellets, which are driven toward a pellet discharge port.

BRIEF DESCRIPTION OF THE DRAWINGS

Certain aspects of the present invention will be described with reference to the following drawings, wherein:

FIG. 4 is a cross sectional side view of an embodiment of a portion of the centrifugal dewatering tower assembly of FIG. 1; and FIG. 5 is a sectional top view illustrating the profile of the auger blade of the dewatering tower of FIG. 4.

DETAILED DESCRIPTION

Conventional pellet dryers operate to remove pellets from a fluid stream and dry the pellets, but often cause damage to the pellets when the pellets contact the drying machinery that produces remnants such as pellet dust, flakes, and "angel hair". Furthermore, conventional dryers are often difficult to clean and prepare for subsequent drying batches or processes, wherein the remnants from previous processes may contaminate the pellets, such as pellets of one color being contaminated by remnants of a different color.

One approach to dewatering a pellet slurry is shown in U.S. Provisional Patent Application No. 60/973,635 filed Sep. 19, 2007, herein incorporated by reference for all purposes. The pre-dewatering tower assembly shown in this application features rotatable pellet deflectors that remove liquid from the pellet slurry. The pre-dewatering unit has a series of slurry water deflectors rotatably coupled to a support bracket and disposed within a screen sleeve. A pellet slurry is input to the pre-dewatering unit and enters the screen sleeve. The slurry impacts the deflectors causing water to be deflected through the sleeve, where it flows to a water outlet, while the pellets sift through the screen sleeve and collect at a pellet discharge port. The pellets are discharged through the pellet discharge port to an inlet of the centrifugal pellet dryer. The pre-dewatering unit may include a series of cleanout water pipes each having a series of sprayer heads for flushing the screen sleeve with high pressure water during a clean-out cycle.

Once the pellet slurry is dewatered, the pellets, which typically still include a significant level of fluid, e.g. water, are often further dried using a centrifugal pellet dryer, such as the conventional dryers noted above. In a conventional dryer, the pellets enter a pellet intake port towards a bottom of the centrifugal dryer assembly and are propelled upward by the blades of a turning rotor, which generally produces an upward air flow. During operation, the rotor blades impact some of the pellets, particularly towards the pellet intake port, where the pellets have typically not been accelerated to the speed of the rotor blades. This results in a higher rate of wear on the rotor blades adjacent to the intake port compared to other blades on the rotor. Also, pellets and fines often become trapped in the bottom of the centrifugal dryer. These trapped pellets and fines are typically difficult to remove in between batches, which increases the time and labor needed to clean the centrifugal dryer.

Figure 1:
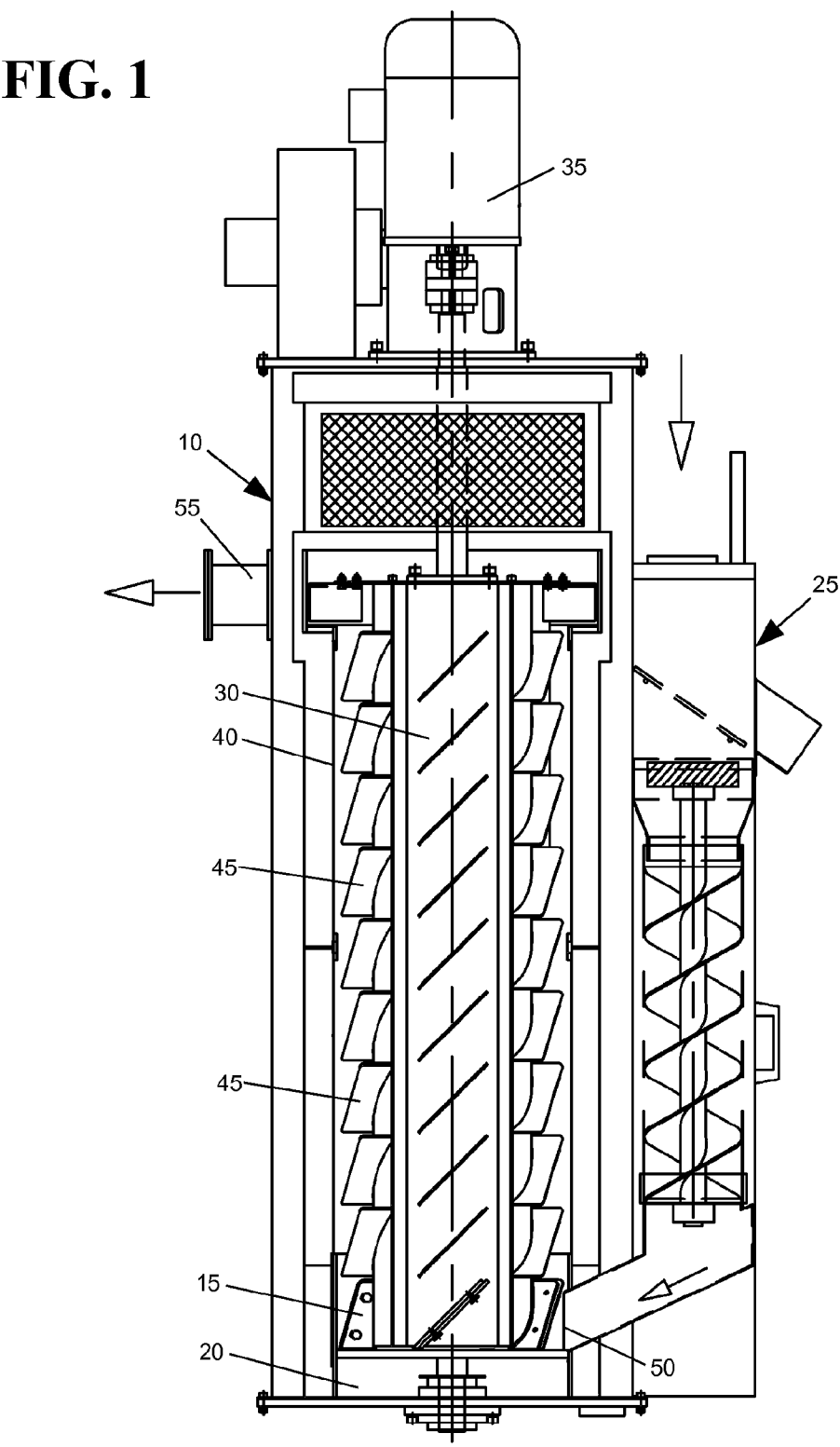
FIG. 1 is a cross sectional side view of an embodiment of a centrifugal dryer assembly having replaceable blades and a rotor seal along with an embodiment of a centrifugal dewatering tower assembly.

FIG. 1 is a cross sectional side view of an embodiment of a centrifugal dryer assembly 10 having replaceable blades 15 and a rotor seal 20 along with an embodiment of a centrifugal dewatering tower assembly 25. In the example of FIG. 1, the centrifugal dewatering tower 25, which is further discussed below, removes a substantial portion of the liquid from the pellet slurry and discharges the dewatered pellets from a pellet discharge port of the dewatering tower into a pellet intake port of the centrifugal dryer.

Similar to many conventional centrifugal dryers, the centrifugal dryer of FIG. 1 includes a rotor 30 that is driven by an electric motor 35, which is a variable frequency, variable speed motor in this example. The rotor rotates within a perforated sleeve 40 or fluid-permeable pellet-impermeable screen within the dryer housing or the perforated sleeve is attached to the rotor and rotates with it. In the illustrated example, the perforated sleeve forms part of the rotor housing. The standard blades 45 on the rotor 30 generate an upward air flow within the perforated sleeve, which lifts pellets from the pellet intake or inlet port 50 upward towards the pellet outlet port 55 of the dryer. The pellets are further dried by the air flow as they are lifted toward the pellet outlet.

The rotor of FIG. 1 includes replaceable blades 15 that are attached to the rotor 30 adjacent to the pellet intake port 50. When the pellets enter the pellet intake port 50, they are typically moving at a different velocity relative to the replaceable rotor blades. The difference in velocity results in pellets having relatively high energy impacts with the replaceable rotor blades and, in particular, with a replaceable rotor blades when it is directly adjacent to the intake port where the difference in velocity is greatest. The high energy impacts on these replaceable rotor blades 15 causes much greater wear on them than on the other standard blades 45 of the rotor that are configured to spin the pellets within the dryer while elevating the pellets towards the outlet port.

Figure 2:
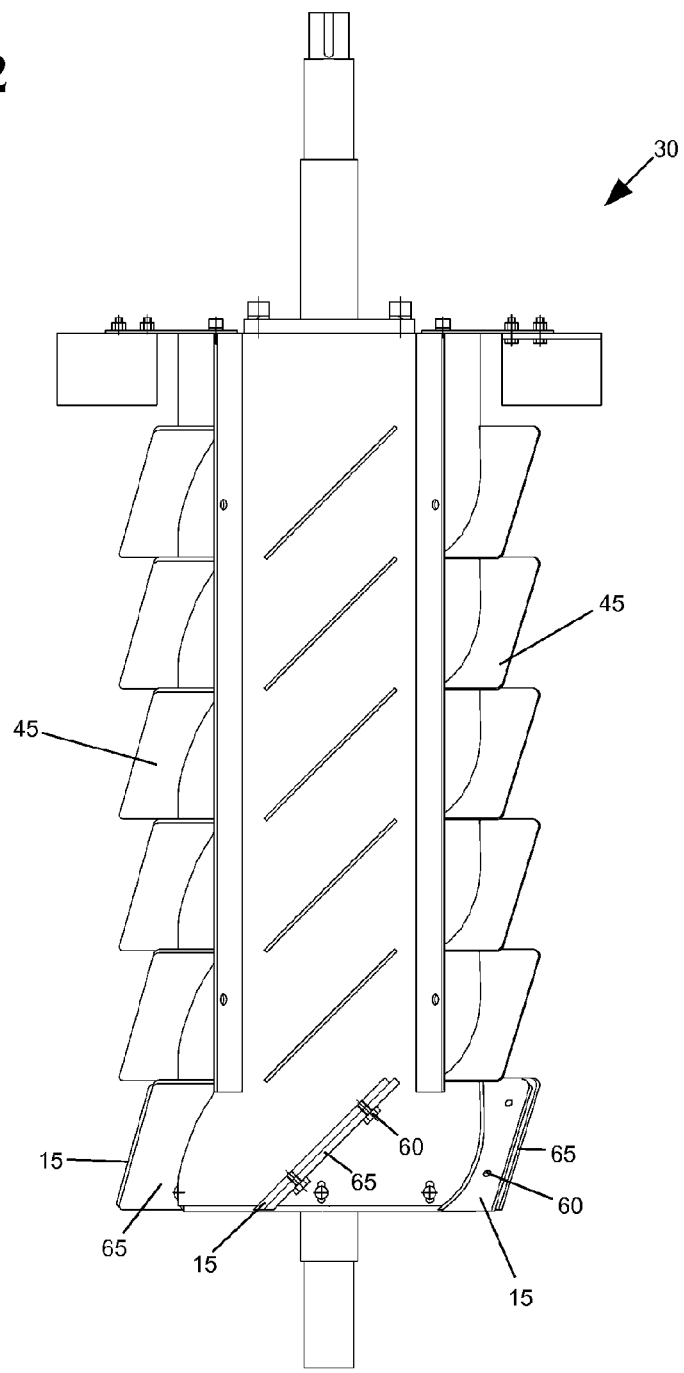
FIG. 2 is a side view of an embodiment of the rotor with replaceable blades for the centrifugal dryer assembly of FIG. 1.

The rotor 30 is further illustrated in the side view of FIG. 2. In this embodiment of a rotor, replaceable rotor blades 15 or impact plates are removeably fastened to the rotor at the portion of the rotor that is configured to be adjacent to the pellet intake port of the centrifugal dryer. In this example, the replaceable portion of each blade is part of a particle accelerating assembly that includes a replaceable rotor blade fastened by screws 60 to a permanent flange 65 that is connected and rigidly secured to the rotor body. During a portion of a revolution of the rotor, the flange 65 is positioned adjacent to the inlet port of the housing. As the rotor revolves, the replaceable rotor blades 15 rotationally lead the flange such that the majority of pellet impacts on the particle accelerating assemblies occur on the replaceable rotor blades. The flange is positioned at approximately the same elevation, or is elevationally aligned with the inlet port of the housing. In other embodiments, different methods may be employed to fasten the replaceable blades to the rotor or the replaceable blades may have a lower angle of attack than the standard blades without departing from the scope of this aspect of the invention. As the centrifugal dryer operates, the pellets first impact or preliminary impact with the rotor occurs at the replaceable rotor blades 15 as the pellets enter the dryer through the pellet intake port. As the pellets rise through the housing, the pellets rotate with the standard blades such that the force exerted upon a blade by a pellet is lessened. However, at the pellet inlet port, the pellets are not yet moving with the rotor which results in the replaceable blades experiencing high levels of wear relative to the other blades attached to the rotor. The preliminary impact of the pellet on the replaceable rotor blades angularly accelerates the pellets around the interior surface of the housing while also accelerating the pellets upwards towards the standard rotor blades. When the replaceable rotor blades wear out, they are easily replaced with new replaceable rotor blades thereby extending the service life of the rotor and reducing maintenance cycles.

In one exemplary embodiment, the replaceable blades may be made from hard wear resistant materials, such as plasma coated tool steels, e.g. CPMIO and 15V, ceramics, and polycrystalline diamond (PCD) coated metals. In another exemplary embodiment, the replaceable blades may also be made from military specification grade polyurethane, which has high wear resistance and also tends to absorb cushion the impact of the pellets. The impact plate may include a cushioned elastic surface structured to further absorb the impact of the pellets. In an alternate embodiment, the impact plate may be harder than the standard blades in order to decrease the frequency of impact plate replacements.

FIGS. 1, 3, 3A, and 3B illustrate another aspect of this example of a centrifugal dryer. A self-cleaning rotor seal 20 is provided at the bottom of the dryer, adjacent to the particle accelerating assemblies, that interfaces with the axle of the rotor to reduce the trapping of pellets and fines in the centrifugal dryer, which typically requires significant labor and time to thoroughly clean out between batches and sometimes results in contamination between batches. In the embodiment shown, the rotor seal includes a bottom plate 70 that is mounted in the bottom of the dryer housing and accommodates (and circumscribes) the shaft 75 or axle of the rotor. The rotor seal also includes a top plate with a pump seal portion 80 that mounts in the bottom of the rotor such that an outward surface of the pump seal portion will interface with a surface of the bottom plate.

In one embodiment, the pump seal portion of the top plate and the bottom plate are made from low friction plastic, such as high density polyurethane, or Polytetrafluoroethene. Other materials may be utilized and combined, such as a metal pump seal portion combined with a low friction plastic bottom plate. The pump seal portion preferably includes a ring seal 85 with a ring channel 86 of the top plate. The ring seal circumscribes the axle for sealing the shaft of the rotor to protect the rotor bearings from water, fines and other contaminants. The pump seal portion is preferably mounted to the rotor using an alignment slot 90 or mechanism that allows the pump seal portion of the top plate to be positioned in close proximity to the bottom plate 70 or even in contact with the bottom plate when the rotor is mounted in the dryer in order to reduce the gap between the pump seal portion and the bottom plate to prevent pellets and fines from entering the gap. The top plate of the self-cleaning seal rotates with the rotor, or is in fixed rotation with the rotor.

Figure 3:
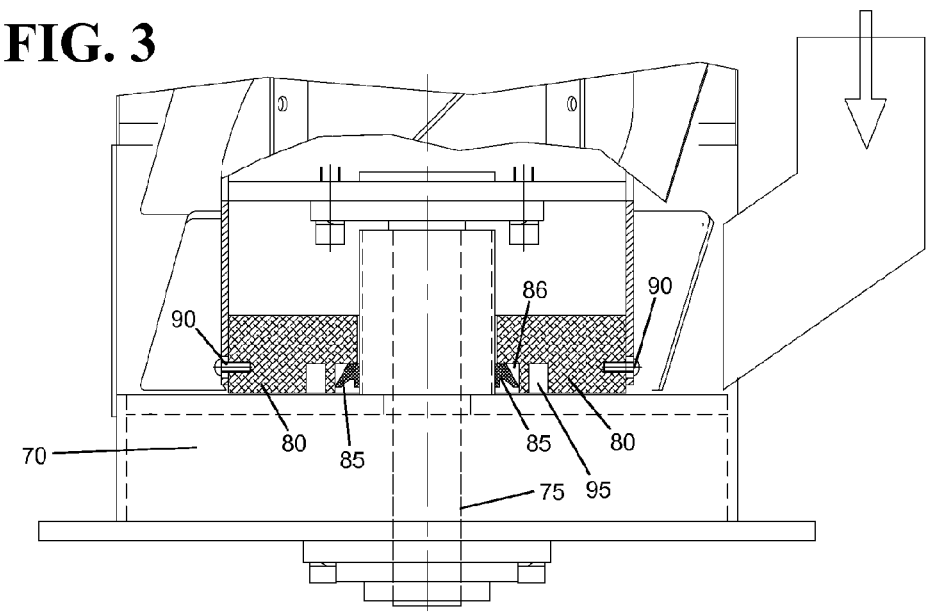
FIG. 3 is a cross-sectional side view of a portion of the rotor with replaceable blades for the centrifugal dryer assembly of FIG. 1 illustrating the rotor seal.
Figure 3A:
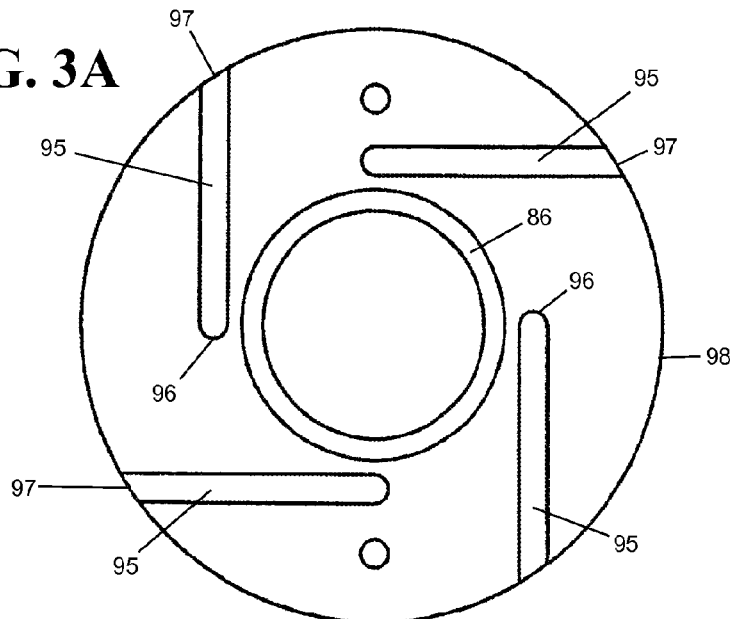
FIG. 3A is an end view illustrating the pump seal from the rotor seal of FIGS. 1 and 3.
Figure 3B:
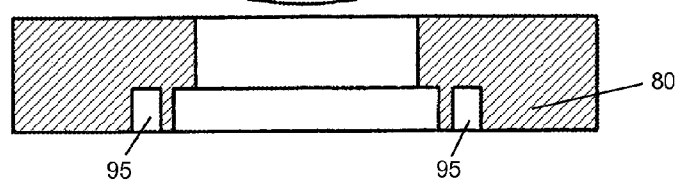
FIG. 3B is a cross sectional view illustrating the pump seal from the rotor seal of FIGS. 1 and 3.

One or more angled slots 95 or grooves, as illustrated in FIGS. 3A and 3B, may be provided in the bottom surface of the pump seal portion of the top plate to pump out pellets, fines, pellet fragments, or other debris that enter the gap between the top plate and the bottom plate in order to provide a self-cleaning function for the rotor seal. The groves each include an interiorly located leading end 96 adjacent to the ring seal 85, and a trailing end 97 located on the outer perimeter 98 of the top plate of the self-cleaning seal. The leading ends are oriented such that when the dryer is operated, and the rotor is revolving, the trailing ends 97 follow the leading ends 96 around the axle or shaft of the rotor such that centripetal force ejects debris through the grooves. In the illustrated example, the bottom surface of the top plate of the self-cleaning seal has a circular outer perimeter and each of the angled slots is aligned with a geometric chord (a line segment between two points on a given curve) of the circular outer perimeter. The resulting rotor seal may reduce change-over time and cross-contamination between batches.

FIG. 4 is a cross sectional side view of an embodiment of a centrifugal dewatering tower assembly 25 according to the present invention having a helical auger 100 for removing liquid from the pellet slurry. Similar to the pre-dewatering unit discussed above, pellet slurry is input to a slurry inlet 105, which funnels the slurry into a fluid-permeable pellet-impermeable perforated sleeve 110 or mesh circumscribing a helical auger or screw. The helical auger is sized to fit within the sleeve and rotate within the sleeve. The augur pushes the pellets against an interior surface of the mesh, and causes fluid on the pellets to pass through the mesh. The space between the inner diameter of the sleeve and an outer diameter of the helical auger is preferably large enough to permit rotation, but small enough to prevent pellets from fitting between the auger and the sleeve. The sleeve is preferably stainless steel. The sleeve is mounted inside a tower housing that collects liquid from the pellet slurry and discharges the liquid through a water discharge port.

The helical auger is supported by a top auger bearing 115 and a bottom auger bearing 120 that permit rotation of the auger within the sleeve. The axis of rotation of the auger is substantially vertical. In this embodiment, a water turbine 125 is coupled to a top end of the helical auger so that the flow of the pellet slurry into the dewatering tower drives the rotation of the auger. In other embodiments, different drive mechanisms, such as a sealed electric motor, may be utilized. The auger may be constructed in a variety of ways, such as a single helix or a double helix form.

In operation, the pellet slurry enters the dewatering tower via the slurry inlet 105 and enters the auger as it rotates within the sleeve. The rotational motion of the auger causes water to be driven through the perforations in the sleeve by centrifugal force, where the water is collected with the dewatering tower housing. The rotational motion of the auger also drives the pellets through the sleeve toward a pellet discharge port 130, where the pellets are discharged for further drying and processing. While the pellets still typically contain moisture once they have passed through the dewatering tower, the bulk of the water or other liquid has been removed from the pellet slurry and, preferably, recycled.

In another embodiment, both the sleeve and the helical auger rotate together, which reduces the amount of impact on the pellets in the pellet slurry. Reducing the impact on the pellets reduces the fines produced during the dewatering process. In this embodiment, the sleeve and auger are rotatably mounted together within the dewatering housing and rotate together. Similar to the embodiment above, the rotational motion causes water to be separated from the pellet slurry by centrifugal motion while the pellets are driven toward the pellet discharge port.

FIG. 5 is a cross sectional view of the helical auger along a section perpendicular to an axis of rotation of the helical auger that illustrates a central rod 135 of auger and the profile of a helical blade 140 of the helical auger. In this embodiment, the auger blade tapers from an attachment point 145 to the central rod towards an outer diameter 150 of the helical blade.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

We claim:

1. A centrifugal pellet dryer comprising:
   a housing having a pellet outlet port located above a pellet inlet port,
   a rotor disposed within the housing, the rotor including
      a plurality of blades located between the inlet port and the outlet port, the plurality of blades structured for
         spinning the pellets and
         elevating the pellets towards the pellet outlet port;
      a flange located mounted on the exterior of the rotor and intermittently adjacent to the inlet port while the dryer is operational, the flange positioned to
         contact pellets entering the housing through the inlet port, and accelerate pellets upwards towards the plurality of blades; and
   an impact board mounted to the flange, the impact board being replaceable when worn;
   a self-cleaning seal including
      a bottom plate circumscribing the rotor and rigidly secured to the housing; and a top plate in fixed rotation with the rotor, the top plate having
      a bottom surface adjacent to the bottom plate, the bottom surface having a plurality of grooves for directing particle debris out from between the top plate and the bottom plate, each of the plurality of grooves extending from about the rotor to an outer perimeter of the bottom surface, the top plate further including
         an alignment mechanism for raising and lowering a portion of the bottom surface in relation to the bottom plate.

2. The centrifugal pellet dryer of claim 1, wherein the composition of the impact board is distinct from the composition of the plurality of blades, and the composition of the impact board includes a material selected from a group consisting of plasma coated tool steel, ceramics, polycrystalline diamond coated metal, and military specification grade polyurethane.

3. The centrifugal pellet dryer of claim 1 wherein the impact board includes a cushioned surface for dampening pellet impacts within the dryer.

4. The centrifugal pellet dryer of claim 1 wherein the plurality of blades are harder then the impact board.

5. The centrifugal pellet dryer of claim 1 wherein the impact board is located on a leading surface of the flange when the rotor is rotated.

6. The centrifugal pellet dryer of claim 1 further comprising:
   a dewatering tower including
      a slurry inlet directing a fluid particle mixture towards a helical augur; a fluid-permeable particle-impermeable mesh circumscribing the helical augur;
   and
      a discharge port directing pellets towards the inlet port of the housing.

7. The centrifugal pellet dryer of claim 6 wherein the dewatering tower includes a water turbine secured to the helical augur for driving the rotation of the helical augur.

8. The centrifugal pellet dryer of claim 1 wherein the bottom surface has a circular shape, and each of the plurality of grooves is aligned with a chord of the circular shape.

9. The centrifugal pellet dryer of claim 8 further comprising:
   a dewatering tower including
      a slurry inlet directing a fluid particle mixture towards a helical augur; a fluid-permeable particle-impermeable mesh circumscribing the helical augur;
   and
      a discharge port directing pellets towards the inlet port of the housing.

10. The centrifugal dryer of claim 1 wherein each of the plurality of grooves includes
   a leading end adjacent to the rotor and a trailing end at the outer perimeter of the
   bottom surface,
   wherein the trailing end rotationally follows the leading end when the rotor rotates.

11. The centrifugal dryer of claim 10 wherein the flange rotationally follows the impact board when the rotor rotates.

12. The centrifugal pellet dryer of claim 11 wherein the plurality of blades are harder then the impact board.

\* \* \* \* \*